United States Patent [19]

Failes

[11] Patent Number: 4,688,882
[45] Date of Patent: Aug. 25, 1987

[54] OPTICAL CONTACT EVANESCENT WAVE FIBER OPTIC COUPLER

[75] Inventor: Michael Failes, Moffat, Canada

[73] Assignee: Canadian Instrumentation and Research Limited, Mississauga, Canada

[21] Appl. No.: 700,281

[22] Filed: Feb. 11, 1985

[51] Int. Cl.⁴ .......................... G02B 6/26; G02B 6/42
[52] U.S. Cl. .................................................. 350/96.15
[58] Field of Search .............. 350/96.15, 96.16, 96.17, 350/96.21, 96.30

[56] References Cited

U.S. PATENT DOCUMENTS

| | | |
|---|---|---|
| 4,360,247 | 11/1982 | Beasley . |
| 4,386,822 | 6/1983 | Bergh . |
| 4,387,954 | 6/1983 | Beasley . |
| 4,431,260 | 2/1984 | Palmer .......................... 350/96.15 |
| 4,461,536 | 7/1984 | Shaw et al. . |
| 4,469,397 | 9/1984 | Shaw et al. . |
| 4,473,270 | 9/1984 | Shaw ............................... 350/96.15 |
| 4,493,528 | 1/1985 | Shaw et al. . |
| 4,632,513 | 12/1986 | Stowe et al. ..................... 350/96.15 |

Primary Examiner—Robert E. Wise
Attorney, Agent, or Firm—Riches, McKenzie & Herbert

[57] ABSTRACT

A single mode, evanescent wave, fiber optic coupler. The coupler comprises a pair of substrates, each substrate having an optically worked fiber embedded therein and wherein the substrates are secured together such that the optical fibers are in optical contact and are in effective fusion with each other.

14 Claims, 13 Drawing Figures

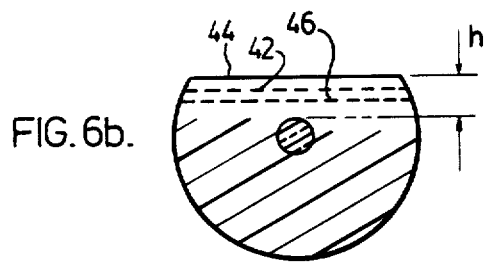
FIG.6b.
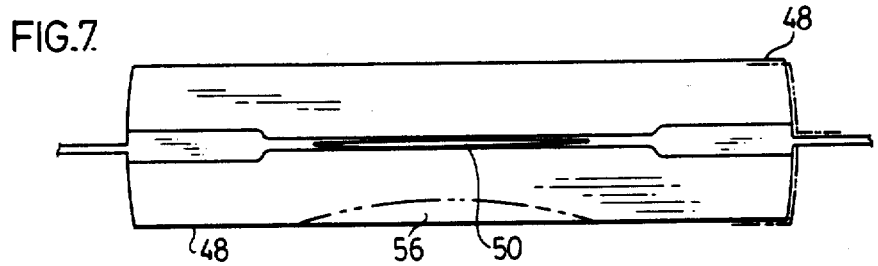
FIG.7.
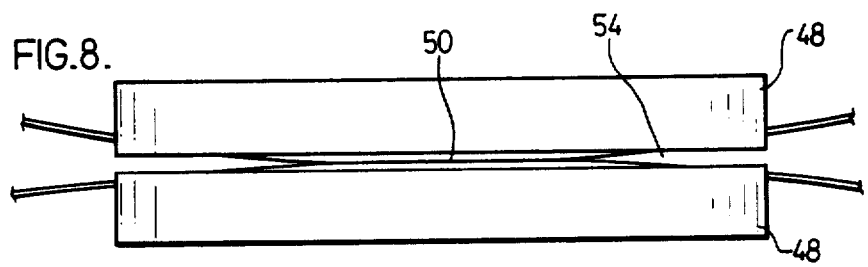
FIG.8.
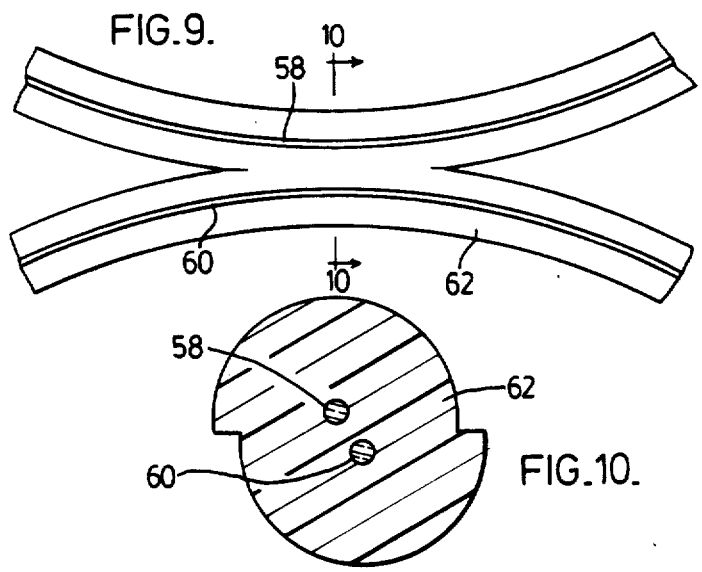
FIG.9.
FIG.10.

OPTICAL CONTACT EVANESCENT WAVE FIBER OPTIC COUPLER

BACKGROUND OF THE INVENTION

1. Field of the Invention

This invention relates generally to optical couplers and more particularly, to a novel single mode coupler which is temperature insensitive, hermetically sealed and which exhibits virtually zero loss. The coupler of this invention is produced by means of optical contact of ground and polished fiber components.

2. Description of the Prior Art

Optical couplers are well known and various methods have been proposed to manufacture and assemble single mode optical couplers. The present invention is primarily directed to single mode, evanescent wave, fiber optic couplers.

The function of a fiber optic coupler is to divide or combine the optical power between two fibers. In the particular case of single-mode fibers, this can be achieved through the interaction of the evanescent wave fields in the two fibers, which extend outside the core.

Fiber optic couplers are used in two major fields; namely, optical sensors and communication. The performance requirements are similar in both cases and these include (a) low loss, (b) specified coupling ratio from 0 to 1, (c) minimum temperature dependence of (a) and (b), and (d) mechanical stability.

For field-useable optical sensors, temperature stability is very important. In the case of ring-resonator sensors, very low loss is also critical, as is the ability to tune the coupling ratio very accurately. Both these factors affect the resonator finesse and hence the sensor sensitivity.

For communications systems such as local area networks or data bus lines, the lower the loss, the more couplers (branches) can be used. The tolerable loss is well under 1% in many cases. Both temperature and mechanical stability and the ability to set the coupling ratio precisely are fundamental considerations for the system designer.

The optical couplers found in the prior art suffer from one or more important drawbacks, including sensitivity to temperature, relatively large loss and mechanical instability.

Several of these couplers and the methods of producing them are described in the literature and in prior issued patents. Reference is made in particular to U.S. Pat. No. 4,387,954 which issued on June 14, 1983 to Beasley and assigned to Gould Inc.; U.S. Pat. No. 4,307,933 issued to Palmer et al and assigned to General Dynamics; U.S. Pat. No. 4,386,822 issued to Bergh and assigned to The Leland Stanford Junior University and U.S. Pat. No. 4,410,275 granted to Shaw et al.

The disadvantages of these prior art methods are well known as stated hereinbefore, and it is to overcoming these problems to which the present invention is directed.

More specifically, with "twist-etched couplers", such as those disclosed in S. K. Sheem and T. G. Giallorenzi, (1979) Optics Letters, 4, 29 and in P. C. Tran et al, (1981) IEEE, J. Quantum Electronics QE-17, 988, the etching removes the fiber cladding from all around and weakens the fiber. This coupler has not been demonstrated with low loss and with temperature stability, because of the difficulty in finding a suitable potting material. A further disadvantage is that the coupling ratio must be fixed during fabrication.

Fused biconical couplers, such as those disclosed in B. S. Kawasaki et al, (1981) Optics Letters 6, 327 and T. Bricheno and A. Fielding, (1984) Electronics Letters 20, 230, have not been demonstrated with very low losses, due to the deformation of the fiber during fusion. The coupling ratio is fixed during fabrication as with the twist-etched couplers.

C. A. Villarruel and R. P. Moeller, in the (1981) Electronics Letters disclose a combination of the twist-etched couplers and the fused bioconical couplers but such combination suffers from the same drawbacks as each of the foregoing types.

The special D-shaped fiber couplers, as disclosed by L. G. Schoner et al, (1982) Electronics Letters 18, 567 is a coupler formed by fusing two D-shaped fibers thus obviating the need for grinding and polishing. However, large losses were reported as well as substantial polarization dependence of coupling ratio due to the distorted fiber shape.

Polished block couplers such as those disclosed in R. A. Bergh et al, (1980) Electronics Letters 16, 261; M.J.F. Digonnet and H.J. Shaw, (1982) IEEE, J. Quantum Electronics, QE-18,746; O. Parriaux et al, (1981) Applied Optics 20, 2420 and P. Jaccard et al, (1983) 9th European Conference on Optical Communications, H. Melchior and A. Sollberger (eds), p. 409, use index matching oils which makes them very sensitive to temperature, as the refractive index of the oil changes rapidly with temperature. The oil must also be of high purity such that light is not scattered by particulate matter in the oil interface layer.

Typically, as stated in Digonnet et al (supra), there is a 1:2 change in coupling ratio over 25° C. to 30° C. Both the coupling ratio and loss are drastically affected by temperature.

Polarization preserving and polarizing fiber can also be used to make a polarization preserving (PP) coupler which is very important for sensors where polarization maintenance is critical. However, even PP couplers as disclosed in the prior art (see M. Kawachi et al, (1982) Electronics Letters 18, 962; C. A. Villarruel et al, (1983) Electronics Letters 19, 18; R. B. Dyott and J. Bello, (1983) Electronics Letters 14, 601; and B. K. Nayar and D. R. Smith, (1983) Optics Letters 8, 453) suffer generally from the drawbacks as stated hereinbefore.

SUMMARY OF THE INVENTION

Accordingly, it is an object of the present invention to at least partially overcome these disadvantages by providing a novel single mode coupler which is temperature insensitive, hermetically sealed, mechanically stable, exhibits virtually zero loss, by means of optical contact of ground and polished fiber components.

It is a further object of this invention to provide a novel method for the production of a novel single mode coupler which is temperature insensitive, hermetically sealed, mechanically stable and which exhibits virtually zero loss.

A still further object is to provide a method which allows the coupling ratio adjustment to be the final step in assembling a sensor, by contacting the two already polished coupler halves. Wrapping of the fiber around a piezoelectric or other transducer is then greatly facilitated and no splices are needed to connect the coupler to the rest of the sensor.

To this end, in one of its aspects, the invention provides a single mode, evanescent wave, fiber optic coupler consisting of a pair of substrates, each substrate having a slot therein in which an optical fiber is embedded, said substrates secured together such that the optical fibers are in effective fusion with each other.

In another of its aspects, the invention provides a single mode, evanescent wave, fiber optic coupler consisting of a pair of glass block substrates which are optically ground and polished, each glass block having a slot therein, in which an optical fiber is cemented with a resin cement, said optical fiber comprising a core and a cladding protected by a plastic jacket which has been removed from a central portion of each fiber, the slot having a central portion of a diameter marginally greater than the diameter of the cladding of said optical fiber, and two end sections of a diameter substantially greater than the diameter of said optical fiber, and a part of the cladding of each optical fiber having been removed with the remaining part protruding marginally above the surface of each glass block and having been highly polished, said glass blocks cemented together under slight compression using a resin cement such that the protruding cladding parts are in optical contact and are in effective fusion with each other.

In yet another of its aspects, the invention provides a method of producing a single mode, evanescent wave, fiber optic coupler which comprises producing a pair of glass blocks, embedding an optical fiber in each block, grinding and polishing said blocks, securing said ground and polished blocks such that the fibers are in effective fusion with each other.

Further objects of this invention will be apparent from the following description taken in conjunction with the following drawings.

BRIEF DESCRIPTION OF THE DRAWINGS

FIG. 6b is a sectional view of a fiber having different cladding heights.

FIG. 7 is a plan view of a pair of optically contacted fibers embedded in glass blocks which are the broken out centre portions of the disc of FIG. 5.

FIG. 8 is a side elevational view of FIG. 7.

FIG. 9 is a partial view of the fiber to fiber contact area of the coupler.

FIG. 10 is a sectional view on line 10—10 of FIG. 9.

DESCRIPTION OF THE PREFERRED EMBODIMENT

Figure 1:
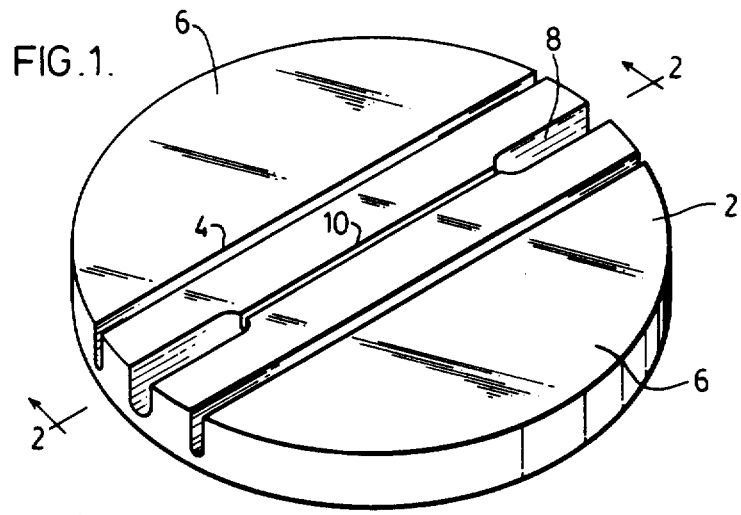
FIG. 1 is a perspective view of a glass disc suitable for use to produce the new coupler of the present invention.

Reference is first made to FIG. 1 which shows a perspective view of a glass disc used to produce the coupler of the present invention.

A glass disc 2 is disc cut from a float glass plate. Float glass has been selected as it is readily available, low in cost and most importantly, it is softer than fused silica which is the material from which most optical fibers are made. Pyrex and other glasses have been used but any optically workable substrate may be used as long as the optical working properties of the substrate result in faster polishing or removal of material than the material of the fiber itself.

Large slots 4 are cut in the glass disc 2 by any suitable means such as a diamond wheel, to enable the outer sections 6 to be broken off at a subsequent work stage. Partial slots 8 are cut in the glass disc 2 to provide clearance to the fiber as will be explained hereinafter. A slot 10 is made by means of a wire saw and alumina grit, and has a width and a depth just greater than the cladding diameter. In the preferred embodiment, slot 10 in the middle region has a radius R, defined in a plane perpendicular to the glass disc surface, of about 50 cms. There is a large tolerance on this radius.

Figure 2:
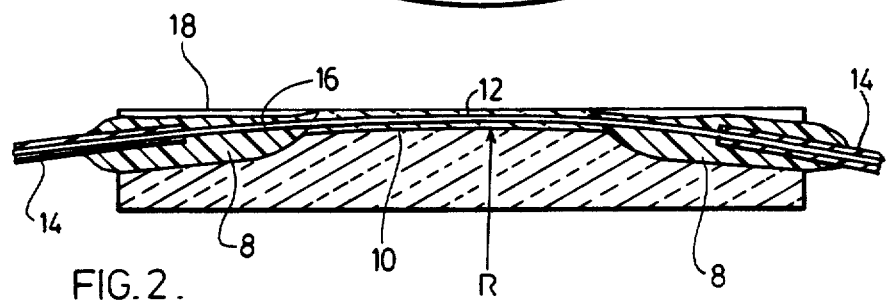
FIG. 2 is a partial sectional view along line 2—2 of FIG. 1 with a fiber embedded in the glass disc.

Referring now to FIG. 2, a fiber 12 is first prepared by removing a small length of the plastic jacket 14 in the region 16. It is then cemented into the slot 10 using a resin cement. As seen in FIG. 2, slots 8 are so constructed to allow a large clearance for the fiber 12 and plastic jacket 14 with respect to the disc surface 18. The slots 8 are filled to just below the disc surface 18 with a resin cement. Slight tension is applied during the curing of the cement to ensure that the fiber 12 follows the profile of the slot 10.

Figure 3:
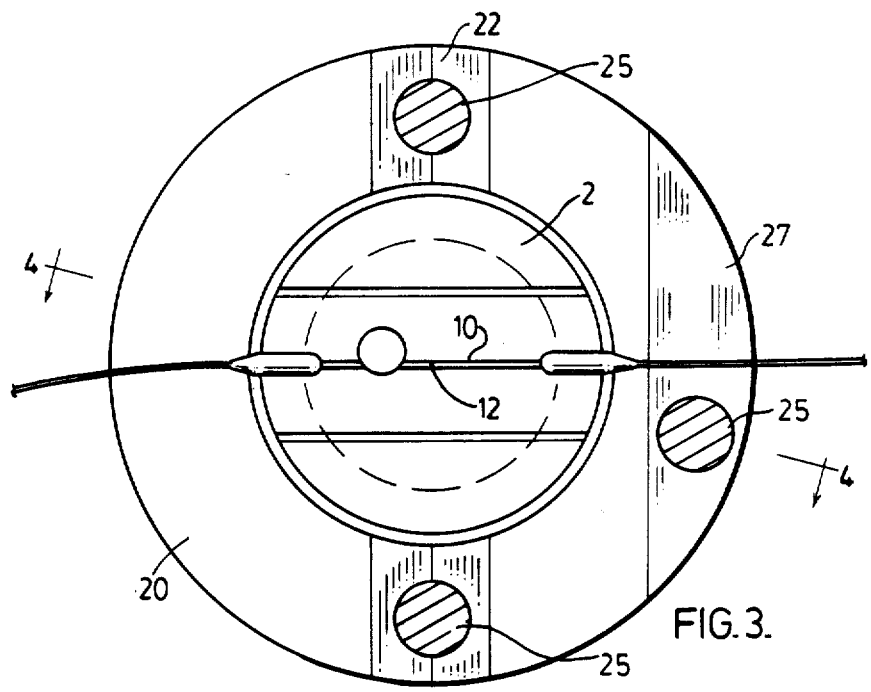
FIG. 3 is a perspective view of the glass disc mounted on a metal ring for depth measurement.
Figure 4:
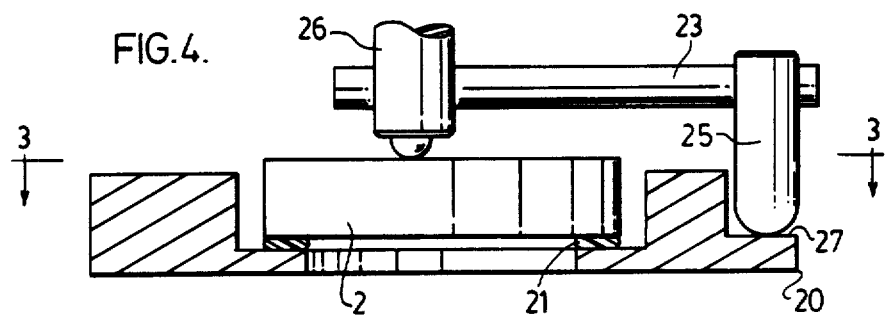
FIG. 4 is a sectional view on line 4—4 of FIG. 3.

As shown in FIGS. 3 and 4, the glass disc 2 is then mounted in a metal ring 20 using a suitable wax or mixture such as bees wax and wood resin mixture 21 which is well known in the optical industry. The metal ring 20 has V grooves 22 and a flat area 27 which are used as positioning and support points for a depth gauge 23 having three ball ended feet 25 and probe 26. The depth gauge is used to measure the amount of material removed from the surface of disc 2 in the immediate area of the slot 10 containing the fiber 12. The glass surface is ground in a similar manner to a lens surface until the fiber cladding is penetrated for a small fraction of its diameter.

Inspection of the fiber under a calibrated microscope allows measurement of the width of the ground part which corresponds to a chord of the circle of the fiber cross-section.

A simple calculation using the fiber diameter determines the distance remaining from the ground surface to the centre of the fiber. This measurement and calculation allows accuracies of better than 1 mircron under the prescribed conditions. This data is used to calculate the time of subsequent grinding and polishing operations on the disc and as a base for further measurements of material removal.

The surface of the disc is then ground with finer grits and subsequently polished with rare earth oxides much in the same manner as a lens or window to laser qality with the following difference. The glass disc chosen as hereinbefore stated is of a material which is softer than the fiber. The polishing tool has an elasticity and plasticity which is specifically chosen for the materials being polished to achieve the fiber to be slightly higher than the substrate.

A tool of soft pitch bees wax and wood flour has been found to have all the desired qualities. Detergents and surface active chemical agents are also used to reduce friction in the polishing operation.

Figure 5:
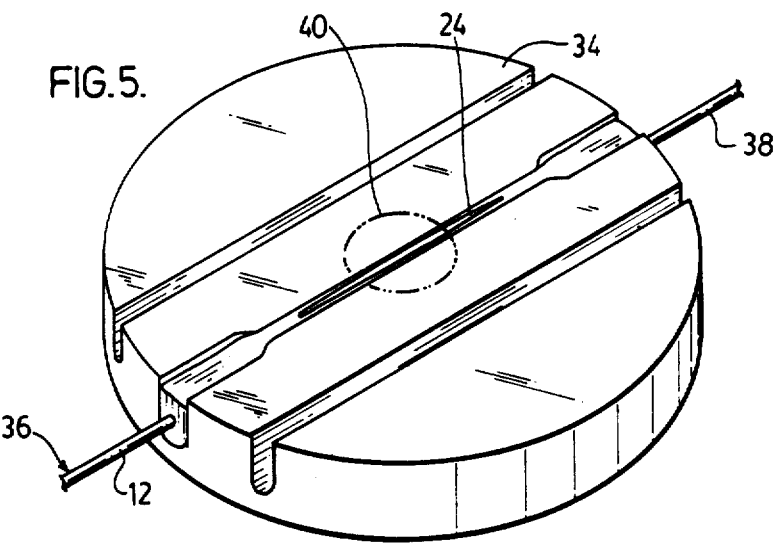
FIG. 5 is a perspective view of a finished polished disc.

FIG. 5 is a perspective view of a finished, polished disc 34. The grinding and polishing are timed such that the amount of cladding removed is within close limits of the desired amount. Further polishing will depend on an oil drop test which indicates completion of polishing.

Laser light of the appropriate wavelength is launched into one end 36 of the fiber 12 and the other end 38 is monitored for light output. There is evanescent wave coupling from the core to the oil drop 40 which is placed on the fiber 12, said coupling being determined by the refractive index of the oil and the distance of the cladding surface from the core, resulting in reduced transmission to the output 38.

The most critical aspect of the process is that the silica fiber, which has been ground and polished, is standing above the glass disc surface due to both its greater hardness and the composition of the polishing tool. This condition is a key factor in subsequent assembly of couplers as will be discussed hereinafter.

It is important that care be taken not to remove all the cladding material and as a result, polish into the core because this can cause losses due to the core cross-section deformation. The grinding and polishing mechanism is also controlled such that the disc has a general small convexity of 2 to 5 optical fringes in green light and has a surface finish of "laser" quality being of very low scatter.

Figure 6A:
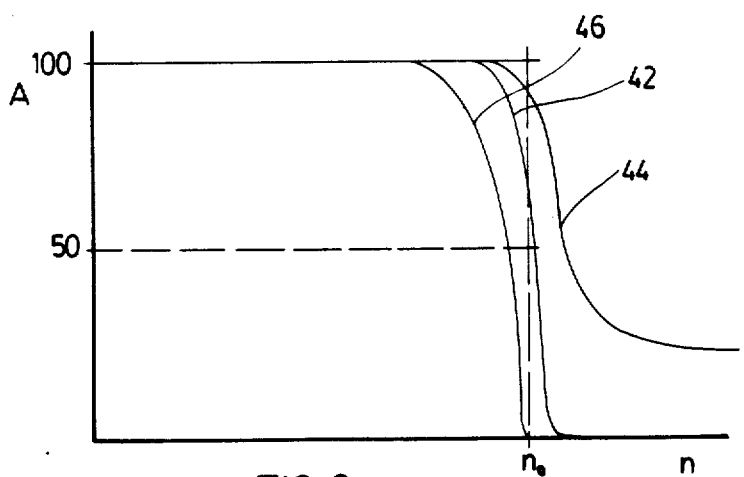
FIG. 6a is a graphical representation of light transmission versus oil index for several cladding heights.

FIG. 6(a) illustrates a light transmission versus oil drop index for three cladding heights h as shown in FIG. 6(b). The light transmission at oil index $N_o$ corresponding to curve 42 is at 50% for a typical mid-ratio coupler. Thicker cladding gives curve 44 and lower coupling ratios. Thinner cladding gives curve 46 and greater coupling ratios.

Referring now to FIG. 7, the outer sections 6 of the glass disc 2 have been broken away leaving only the central parts 48 which form the halves of a coupler. After cleaning, the halves are then placed together with fiber to fiber surface in optical contact as shown in FIG. 8.

Optical contact is an effective fusion of the cladding surfaces as the surface interface is optically transparent. The fiber contact area 50 is very small when compared to the glass area 54 and it is a simple matter to achieve cladding to cladding contact. The slight convexity of the glass block halves also assists in achieving contact in the interaction area of the coupler. The contact is under pressure which causes a negligibly small bending of the fibers and results in contact along an interaction length of several millimeters.

The typical observed fringe pattern 56 indicates the height differential of silica to glass substrate of approximately one-quarter fringe for each half 48 of the coupler. The areas of optical contact are indicated by the black zero fringe observed in the general glass area 54 and along the fiber contact area 50. A wedge is shown for fringe clarity only.

If the silica cladding contact area 50 is coplanar with the glass substrate, it is almost impossible to achieve this contact without the most stringent environmental clean conditions, due to the difficulty in cleaning an area of enormously larger magnitude. It is also not possible to hold the fiber under the required pressure to maintain optical contact.

Referring now to FIGS. 9 and 10, as there is continuous fiber to fiber contact the optical properties of the coupler are the same as two cores 58, 60 within a common cladding 62. The coupling ratio can be controlled by displacement of the coupler halves longitudinally to change the interaction length and transversely to change the core to core separation.

A simple alignment jig which allows the coupler halves to be positioned with respect to each other using differential micrometers may be used to set coupling ratios with 1% accuracy.

Figure 11:
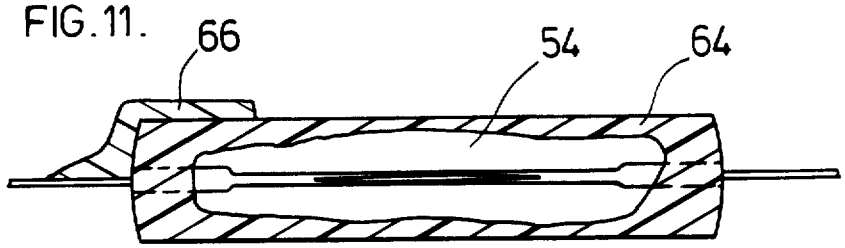
FIG. 11 is a plan view of a coupler of the present invention, with the outer protective layer partially removed.

As shown in FIG. 11, a resin cement of low vicosity may be used to join the two coupler halves. The two halves are maintained under pressure such that the fiber to fiber contact is under compression and a very small elastic deformation of the fiber maintains contact over a few mms of surface. Capillary action draws the resin 64 into the area 54 but not close to the optical contact of the fibers. After curing, the elastic deformation is preserved in the coupler halves which maintains the optical contact under a range of temperature conditions. The difference in expansion coefficient between the glass blocks and the fiber produces uniform compression or tension in the fiber in the core direction which has negligible effect on coupling. An overall coating of resin 66 seals the coupler. Large compression forces are not desirable as they produce birefringence and a variation in coupling with the orientation of polarization of the input light.

Figure 12:
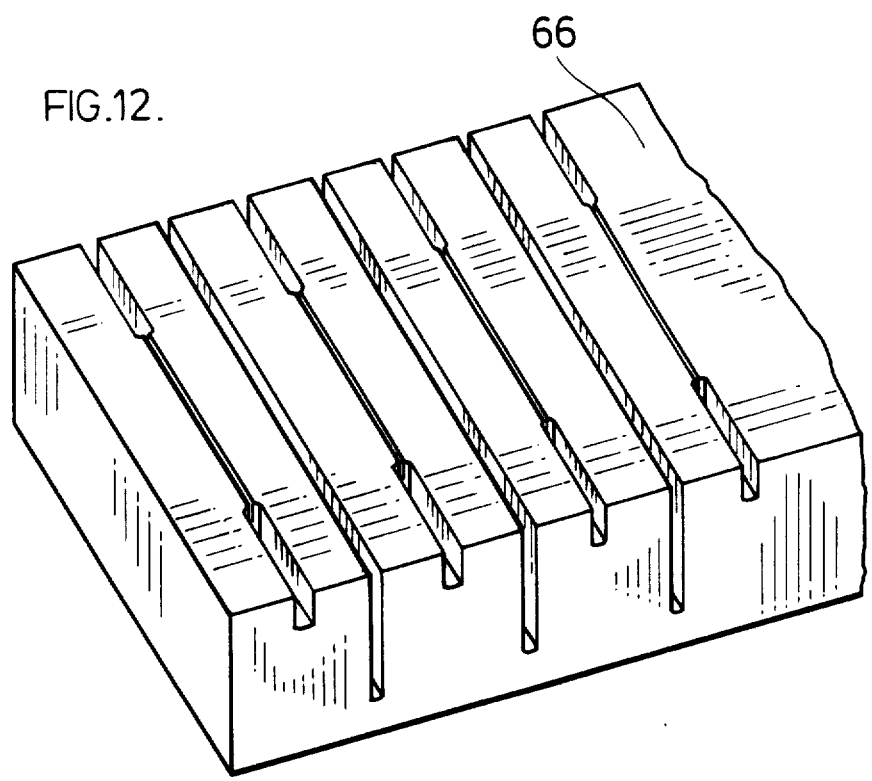
FIG. 12 is a perspective view of a block used for the mass production of couplers of the present invention.

The optical couplers of the present invention may be mass produced or made singly. Mass production can be achieved by multiple mounting of fibers in a rectangular block 66 as shown in FIG. 12.

As there is a range of cladding thickness L for a given ratio couplers, a large yield of useful coupler halves can be obtained from a single block. Individual testing is not necessary during the manufacturing process, if slot depth is well controlled.

The foregoing disclosure illustrates and describes a preferred embodiment of the invention but it is not restricted thereto. This process and the coupler produced thereby produces a coupler with better than one percent ratio accuracy and very low losses of less than one percent at high coupling ratios. For low coupling ratios losses have been found to be negligible. The grinding and polishing of optical surfaces of differing materials in a single operation is an unusual procedure and is avoided in the usual optical manufacturing processes where coplanar surfaces or cospherical surfaces are desired.

There are a wide range of techniques for grinding and polishing which may be used in the present invention. It is the resultant surface profile of the fiber and the glass substrate which is the important factor in the assembly of this coupler by fiber to fiber optical contact and the optical contact which results in temperature independence and stability. The low cost for mass production also is a distinct advantage of the present invention.

The present invention also relates to a half-coupler which may be used to couple light from a single mode fiber into, for example an integrated optic slab wave guide, thus allowing new integrated optical devices to be produced.

The present invention is applicable for single mode, polarization maintaining fibers and polarizing fibers.

Polarization maintaining and polarizing fibers are used for critical applications in sensors where it is necessary to have single polarization.

In the production of polarization maintaining fibers, a stress member or members are used which are generally of different coefficient of expansion to the cladding. This produces a birefringent fiber having two orthogonal axes. When polarized light is launched into one of the axes, it is maintained. A polarization preserving coupler must have the corresponding axes parallel in the interaction region. To achieve this condition the fiber must be rotationally orientated before cementing into the substrate. The orientation is made by viewing the stress member or members by means of a polarizing microscope in monochromatic light and setting it or them horizontal or vertical to the line of sight. There is in this case the assumption that the birefringent axes correspond to the stress member(s) and that subsequent optical working does not seriously cause the axes to change. In practice this has been found to be an acceptable procedure.

While the foregoing disclosure describes and illustrates a preferred embodiment of the invention, it is to be understood that it is not so restricted.

What I claim is:

1. A single mode, evanescent wave, fiber optic coupler comprising a pair of substrates, each substrate having an optically worked optical fiber embedded therein and wherein said substrates are secured together such that the optical fibers are in optical contact and are in effective fusion with each other.

2. A coupler as claimed in claim 1 wherein each substrate has a slot in which the fiber is embedded.

3. A coupler as claimed in claim 2 wherein said glass block is made of one of the materials comprising float glass and pyrex.

4. A coupler as claimed in claim 2 wherein said optical fiber is cemented into said slot.

5. A coupler as claimed in claim 4 wherein said optical fiber is cemented into said slot using a resin cement.

6. A coupler as claimed in claim 1 wherein each substrate is a glass block.

7. A coupler as claimed in claim 6 wherein said glass blocks are cemented together.

8. A coupler as claimed in claim 7 wherein said glass blocks are cemented together under compression using a resin cement.

9. A coupler as claimed in claim 8 which is coated with a resin to seal the coupler.

10. A coupler as claimed in claim 1 wherein said optical fiber comprises a core and cladding with a protective plastic jacket therearound, said plastic jacket having been removed from around a central portion of each fiber.

11. A coupler as claimed in claim 10 wherein each substrate has a slot in which the fiber is embedded and the slot has a central portion of a diameter marginally greater than the diameter of the cladding of said optical fiber, and two end sections of a diameter substantially greater than the diameter of said optical fiber.

12. A coupler as claimed in claim 10 wherein each substrate is a glass block with a slot in which the fiber is embedded, and the surface of said glass blocks have been optically ground and polished and wherein a part of the cladding of the optical fiber has been removed, such that when the two surfaces of the cladding material of the fibers which have been ground and polished are optically contacted, the interface is optically transparent and the assembly effectively acts as a fused or continous single cladding medium containing two cores in close proximity, thereby allowing evanescent wave field overlap and thus optical coupling of light from one fiber to the other.

13. A coupler as claimed in claim 12 wherein a central portion of the cladding of the optical fiber protrudes marginally above the surface of each glass block.

14. A single mode, evanescent wave, fiber optic coupler comprising a substrate made of one of the materials comprising float glass and pyrex consisting of a pair of optically ground and polished glass blocks, each glass block having a slot therein, in which an optical fiber is cemented with a resin cement, said optical fiber comprising a core and a cladding, and a plastic jacket therearound, said plastic jacket having been removed from a central portion of each fiber, said slot having a central portion of a diameter marginally greater than the diameter of the cladding of said optical fiber and two end sections of a diameter substantially greater than the diameter of said optical fiber, and a part of the cladding of each optical fiber having been removed with the remaining part highly polished and protruding marginally above the surface of each glass block, and said glass blocks cemented such that the protruding cladding parts are in optical contact and are in effective fusion with each other.

* * * * *